United States Patent
Tseng et al.

(10) Patent No.: US 8,797,924 B2
(45) Date of Patent: Aug. 5, 2014

(54) METHOD AND APPARATUS TO IMPROVE DISCONTINUOUS RECEPTION (DRX) OPERATION FOR TDD (TIME DIVISION DUPLEX) AND FDD (FREQUENCY DIVISION DUPLEX) MODE IN CARRIER AGGREGATION (CA)

(75) Inventors: Li-Chih Tseng, Taipei (TW); Ko-Chiang Lin, Taipei (TW)

(73) Assignee: Innovative Sonic Corporation, Taipei (TW)

(*) Notice: Subject to any disclaimer, the term of this patent is extended or adjusted under 35 U.S.C. 154(b) by 152 days.

(21) Appl. No.: 13/464,472

(22) Filed: May 4, 2012

(65) Prior Publication Data

US 2012/0281600 A1 Nov. 8, 2012

Related U.S. Application Data

(60) Provisional application No. 61/483,407, filed on May 6, 2011.

(51) Int. Cl.
 *H04J 3/00* (2006.01)
 *H04L 5/00* (2006.01)
 *H04Q 11/04* (2006.01)
(52) U.S. Cl.
 CPC .............. *H04L 5/0007* (2013.01); *H04Q 11/04* (2013.01)
 USPC .......................................... 370/280; 370/294
(58) Field of Classification Search
 CPC .............................. H04L 5/0007; H04Q 11/04
 USPC .................. 370/280, 294, 314, 321, 337, 347
 See application file for complete search history.

(56) References Cited

U.S. PATENT DOCUMENTS

2011/0170420 A1* 7/2011 Xi et al. .................... 370/241

FOREIGN PATENT DOCUMENTS

WO   2011038625 A1   4/2011

OTHER PUBLICATIONS

3GPP TSG RAN WG2 #67bis, Miyazaki, Japan, Oct. 12-16, 2009 (R2-095670).
3GPP TS 36.300 V10.2.0 (Dec. 2010).
3GPP TSG RAN2 Meeting #75, Athens, Greece, Aug. 22-26, 2011(R2-114454).
3GPF TSG RAN2 Meeting #76, San Francisco, US, Nov. 14-18, 2011 (R2-115823).
Search Report corresponding EP Patent Application No. 12003565.4 dated Sep. 17, 2012.
3GPP TSG RAN WG1 #63, Jacksonville, USA, Nov. 15-19, 2010 (R1-106312).
Office Action on corresponding foreign application (JP 2012-106099) from JPO dated Oct. 1, 2013.
Office Action on corresponding foreign application (KR 10-2012-0048201) from KIPO dated Oct. 11, 2013.

* cited by examiner

*Primary Examiner* — Brenda H Pham
(74) *Attorney, Agent, or Firm* — Blue Capital Law Firm, P.C.

(57) ABSTRACT

A method and apparatus are disclosed for performing DRX (Discontinuous) operation. In one embodiment, the method comprises (i) configuring a plurality of cells for carrier aggregation, (ii) configuring the plurality of cells with a plurality of TDD (Time Division Duplex) UL-DL (Uplink-Downlink) configurations, (iii) configuring the plurality of cells for DRX operation, (iv) configuring a set of DRX timers for the plurality of cells, and (v) running the set of DRX timers for the plurality of cells.

41 Claims, 5 Drawing Sheets

US 8,797,924 B2

METHOD AND APPARATUS TO IMPROVE DISCONTINUOUS RECEPTION (DRX) OPERATION FOR TDD (TIME DIVISION DUPLEX) AND FDD (FREQUENCY DIVISION DUPLEX) MODE IN CARRIER AGGREGATION (CA)

CROSS-REFERENCE TO RELATED APPLICATIONS

The present Application claims the benefit of U.S. Provisional Patent Application Ser. No. 61/483,407 filed on May 6, 2011, the entire disclosure of which is incorporated herein by reference.

FIELD

This disclosure generally relates to wireless communication networks, and more particularly, to a method and apparatus to improve discontinuous reception (DRX) operation for TDD (Time Division Duplex) and FDD (Frequency Division Duplex) mode in carrier aggregation (CA).

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for performing DRX (Discontinuous) operation. In one embodiment, the method comprises (i) configuring a plurality of cells for carrier aggregation, (ii) configuring the plurality of cells with a plurality of TDD (Time Division Duplex) UL-DL (Uplink-Downlink) configurations, (iii) configuring the plurality of cells for DRX operation, (iv) configuring a set of DRX timers for the plurality of cells, and (v) running the set of DRX timers for the plurality of cells.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-110451, "WID-LTE_CA_enhancement—Core Part"; R2-112798, "HARQ and Cross-carrier Scheduling for Different TDD Configurations"; R2-112816, "Consideration on Different TDD Configuration"; R2-112938. "Operation Principles of CC specific TDD Configuration"; R2-112946, "Cell specific TDD configuration with inter-band CA"; R2-113216, "Support of Mixed Inter-Band TDD Configurations in Rel-11 CA"; 3GPP TS 36.321 V10.1.0 (2011-03), "E-UTRA; MAC protocol specification"; and 3GPP TS 36.300 V1.0.2.0 (2010-12), "E-UTRAN: Overall description; Stage 2". The standards and documents listed above are hereby expressly incorporated herein.

Figure 1:
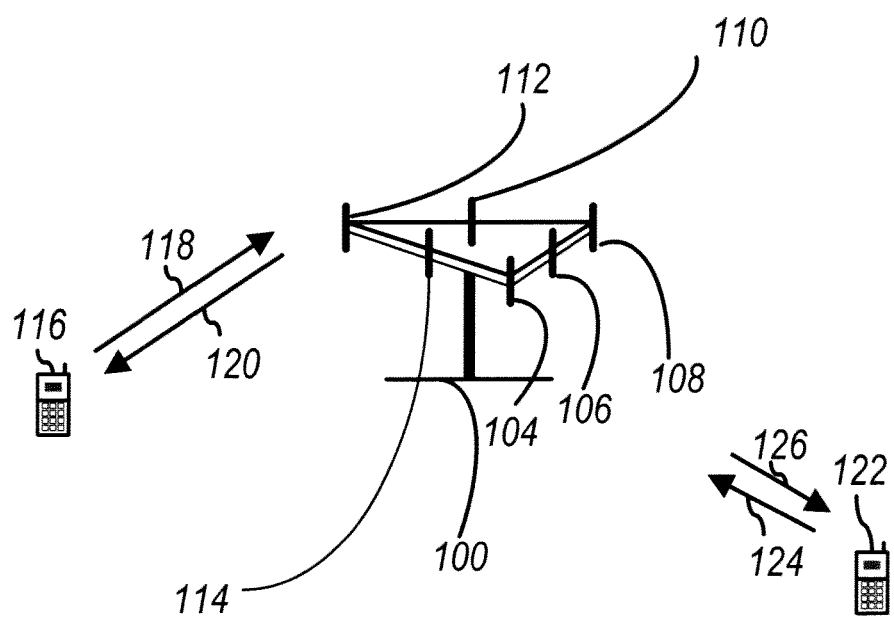
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
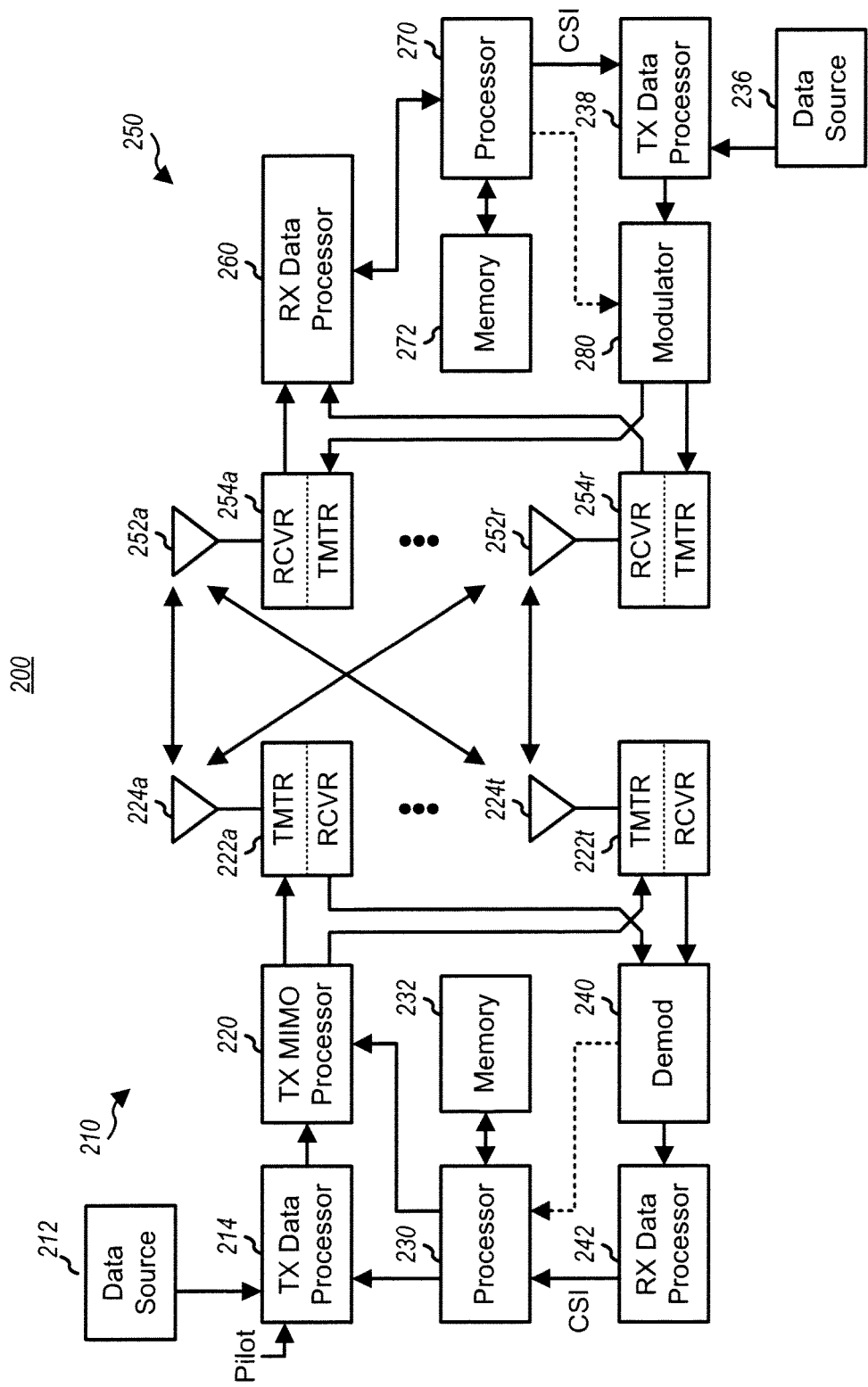
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal front each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
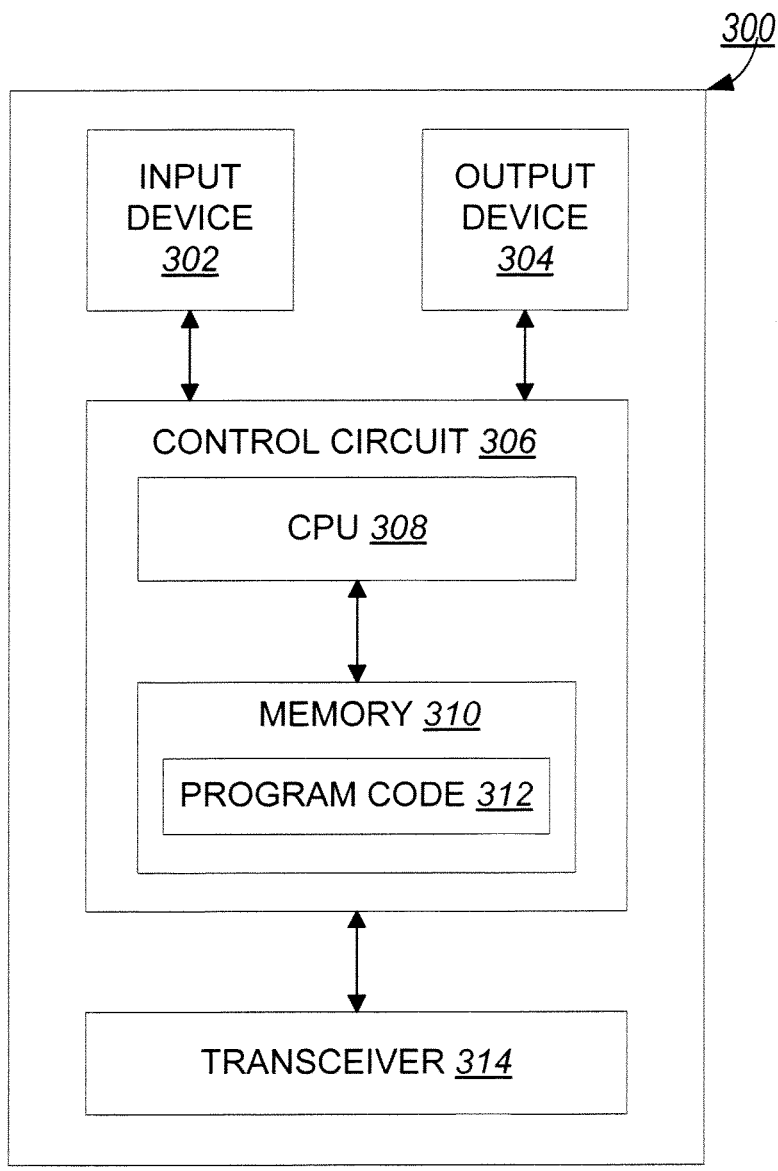
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit, wireless signals, delivering received signals to the control circuit 306, and outputting signals generated by the control circuit 306 wirelessly.

Figure 4:
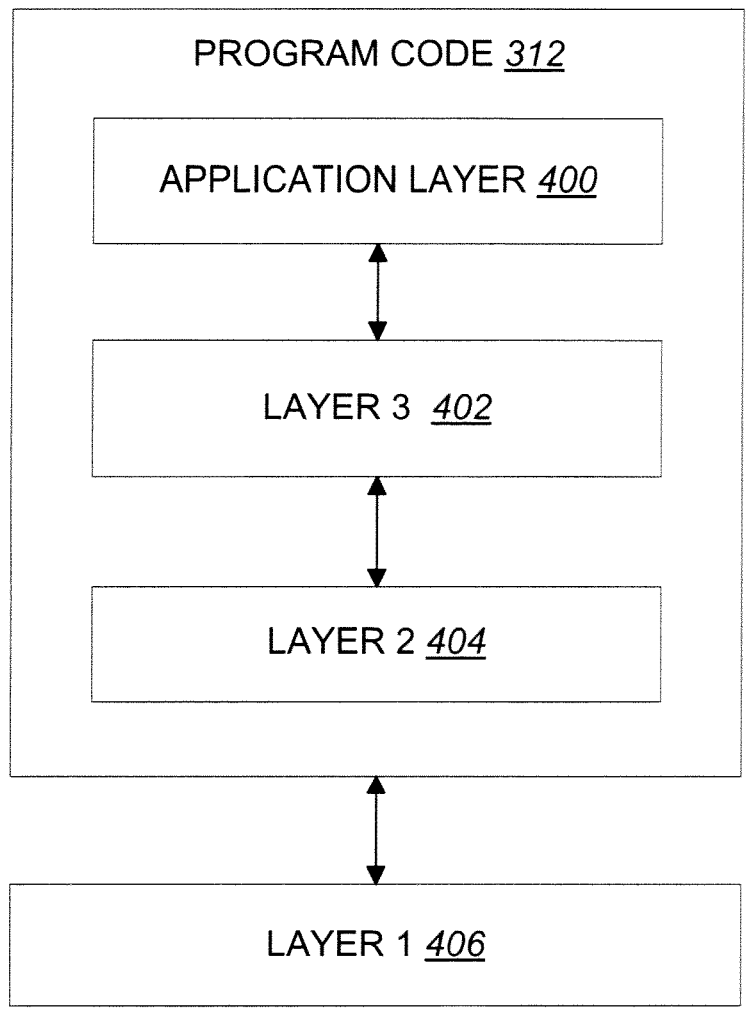
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In general, machine type communication (MTC) is a form of data communication which involves one or more entities that do not necessarily need human interaction. A service optimized for machine type communications may differ from a service optimized for Human to Human communication.

3GPP RP-110451 generally introduces a work item to enhance LTE Carrier Aggregation (CA). More specifically, Section 4 of 3GPP RP-110451 states:

4 Objective*

The work should fulfill the following objectives:
Specify the support of the use of multiple, timing advances in case of LTE uplink carrier aggregation
Identify details for the LTE Carrier Aggregation enhancements methods to be specified through tradeoff analyses where aspects from all the relevant RAN WGs are considered. Redundant solutions and enhancement methods for the same purposes e.g. on different layers should be avoided. Enhancements on the following areas are investigated:

Possible improvements in the related signaling for the use of LTE carrier aggregation, including
i. UL and DL physical layer signaling,
ii. RRC and MAC signaling to support carrier aggregation,
iii. enhanced transmit diversity schemes for PUCCH format 3 and PUCCH format 1b with channel selection Support of inter-band carrier aggregation for TDD DL and UL including different uplink-downlink configurations on different bands

[Carrier Aggregation support for relay backhaul]

As seen in 3GPP RP-110451, different TDD (Time Division Duplex) UL-DL (Uplink-Downlink) configurations on different carriers of CA could possibly be supported. In addition, some discussions regarding HARQ (Hybrid Automatic Repeat reQuest) feedback, deployments of network, tradeoff analysis are introduced in 3GPP R2-112798, R2-112816, R2-112938, R2-112946, and R2-113216.

Furthermore, Section 3.1 of 3GPP TS 36.321 discusses discontinuous reception (DRX operation). In particular, Section 3.1 of 3GPP TS 36.321 states:

Active Time is time related to DRX operation, during which the UE monitors the PDCCH in PDCCH-subframes.

drx-InactivityTimer specifies the number of consecutive PDCCH-subframe(s) after successfully decoding a PDCCH indicating an initial UL or DL user data transmission for this UE.

drx-RetransinissionTimer specifies the maximum number of consecutive PDCCH-subframe(s) for as soon as a DL retransmission is expected by the UE.

onDurationTimer specifies the number of consecutive PDCCH-subframe(s) at the beginning of a DRX Cycle.

PDCCH-subframe refers to a subframe with PDCCH (Physical Downlink Control Channel) or, for an RN (Relay Node) with R-PDCCH (Relay-Physical Downlink Control Channel) configured and not suspended, to a subframe with R-PDCCH. For FDD UE operation, this represents any subframe; for TDD, only downlink subframes and subframes including DwPTS (Downlink Pilot Time Slot). For RNs with an RN subframe configuration configured and not suspended, in its communication with the E-UTRAN, this represents all downlink subframes configured for RN communication with the E-UTRAN.

In addition, Section 5.7 of 3GPP TS 36.321 discusses DRX operation as follows:

5.7 Discontinuous Reception (DRX)

The UE may be configured by RRC with a DRX functionality that controls the UE's PDCCH monitoring activity for the UE's C-RNTI, TPC-PUCCH-RNTI. TPC-PUSCH-RNTI and Semi-Persistent Scheduling C-RNTI (if configured).

When in RRC_CONNECTED, if DRX is configured the UE is allowed to monitor the PDCCH discontinuously using the DRX operation specified in this subclause; otherwise the UE monitors the PDCCH continuously. When using DRX operation, the UE shall also monitor PDCCH according to requirements found in other subclauses of this specification. RRC controls DRX operation by configuring the timers onDurationTimer, drx-InactivityTimer, drx-RetransmissionTimer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined (see subclause 7.7).

[ . . . ]

Furthermore, based on 3GPP TS 36.300, in CA, whenever a UE is configured with only one serving cell (i.e., PCell) Rel-8/9 DRX applies. In other cases, the same DRX operation applies to all configured and activated serving cells (i.e., identical active time for PDCCH monitoring).

In addition, Sections 5.5 and 7.5 of 3GPP TS 36.300 state:

5.5 Carrier Aggregation

In Carrier Aggregation (CA), two or more component carriers (CCs) are aggregated in order to support wider transmission bandwidths up to 100 MHz. A UE may simultaneously receive or transmit on one or multiple CCs depending on its capabilities:

A Rel-10 UE with reception and/or transmission capabilities for CA can simultaneously receive and/or transmit on multiple CCs corresponding to multiple serving cells;

A Rel-8/9 UE can receive on a single CC and transmit on a single CC corresponding to one serving cell only.

CA is supported for both contiguous and non-contiguous CCs with each CC limited to a maximum of 110 Resource Blocks in the frequency domain using the Rel-8/9 numerology.

It is possible to configure a UE to aggregate a different number of CCs originating from the same eNB and of possibly different bandwidths in the UL and the DL.
The number of DL CCs that can be configured depends on the DL aggregation capability of the UE;
The number of UL CCs that can be configured depends on the UL aggregation capability of the UE;
It is not possible to configure a UE with more UL CCs than DL CCs;
In typical TDD deployments, the number of CCs and the bandwidth of each CC in UL and DL is the same.

CCs originating from the same eNB need not to provide the same coverage.

CCs shall be LTE Rel-8/9 compatible. Nevertheless, existing mechanisms (e.g. barring) may be used to avoid Rel-8/9 UEs to camp on a CC.

[ . . . ]

7.5 Carrier Aggregation

When CA is configured, the UE only has one RRC connection with the network. At RRC connection establishment/re-establishment, one serving cell provides the security input (one ECGI, one PCI and one ARFCN) and the NAS mobility information (e.g. TAI) similarly as in Rel-8/9. This cell is referred to as the Primary Serving Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Serving Cells (SCells) can be configured 10 form together with the PC ell a set of serving cells. In the downlink, the carrier corresponding to an SCell is a Downlink Secondary Component Carrier (DL SCC) while in the uplink it is an Uplink Secondary Component Carrier (UL SCC).

The configured set of serving cells for a UE therefore always consists of one PCell and one or more SCells:
For each SCell the usage of uplink resources by the UE in addition to the down/ink ones is configurable (the number of DL SCCs configured is therefore always larger or equal to the number of UL SCCs and no SCell can be configured for usage of uplink resources only);

The number of serving cells that can be configured depends on the aggregation capability of the UE (see subclause 5.5);

PCell can only be changed with handover procedure (i.e. with security key change and RACH procedure);

NOTE: PCell change optimisations (e.g. not involving a handover procedure) are FFS.

PCell is used for transmission of PUCCH;

Unlike SCells, PCell cannot be de-activated (see subclause 12.1);

Re-establishment is triggered when PCell experiences RLF, not when SCells experience RLF;

NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signalling is used for sending die system information of the SCell required for transmission/reception (similarly as in Rel-8/9 for handover).

For TDD, Annex J.1.1 of 3GPP TS 36.300 specifies a restriction that when CA is deployed frame timing, SFN (Single Frequency Network) and TDD-Config are aligned across cells that can be aggregated. And TDD-Config is used to indicate which TDD UL-DL configuration is used (i.e., from #0 to #6). Table 1 below shows the current possibilities.

TABLE 1

| Uplink-downlink configuration | Downlink-to-Uplink Switch-point periodicity | Subframe number | | | | | | | | |
|---|---|---|---|---|---|---|---|---|---|---|
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

As seen, if two TDD Component Carriers are aggregated, they should have the same UL-DL configuration (i.e., the same index). Furthermore, based on 3GPP TS 36.211, for each subframe in a radio frame, "D" denotes the subframe is reserved for downlink transmissions, "U" denotes the subframe is reserved for uplink transmissions, and "S" denotes a special subframe with the three fields DwPTS, GP and UpPTS (Uplink Pilot Time Slot).

When PCell (Primary Serving Cell) and different SCells (Secondary Serving Cells) with different TDD UL-DL configurations are aggregated in CA, the implementation of using the same DRX configuration may not be applicable because if UE is still configured with one set of drx-InactivityTimer, drxRetransmissionTimer, and onDurationTimer, there needs to be a way to handle how to run the timers for consecutive PDCCH-subframe(s) on the aggregated cells.

Figure 5:
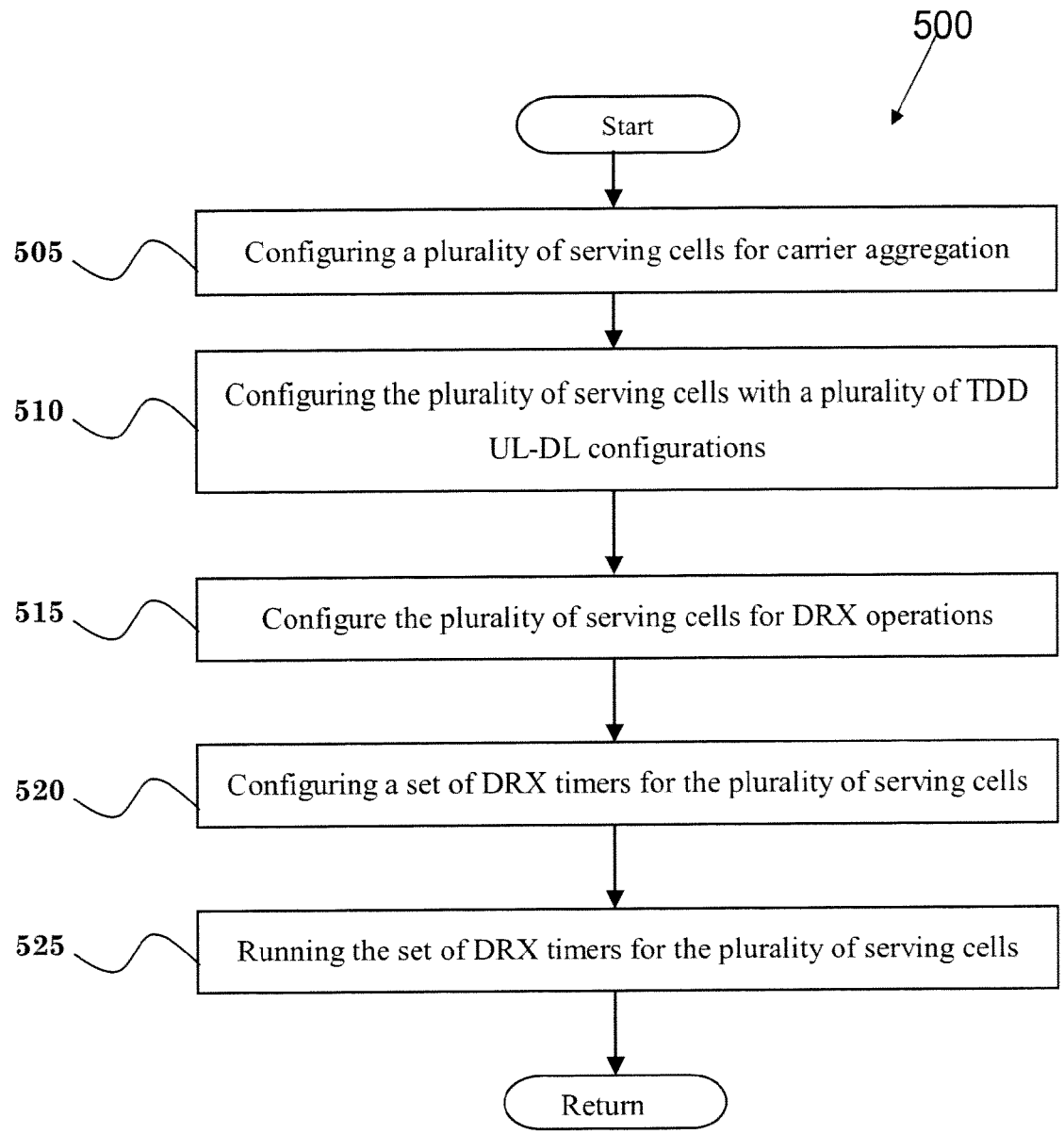
FIG. 5 illustrates a flow chart in accordance with one exemplary embodiment.

FIG. 5 illustrates a flowchart 500 in accordance with one exemplary embodiment. In step 505, a plurality of serving cells is configured for carrier aggregation. In step 510, the plurality of serving cells is configured with a plurality of TDD (Time Division Duplex) UL-DL (Uplink-Downlink) configurations. In step 515, the plurality of cells is configured for DRX operation. In step 520, a set of DRX timers is configured for the plurality of cells. Step 525 involves running the set of DRX timers for the plurality of cells.

In one embodiment, assuming that at least two cells with different TDD UL-DL configurations are aggregated and the DRX operation is configured, one set of DRX timers could be configured per TDD UL-DL configuration so that there will be the same active time for the cells with the same TDD configuration. The set of DRX timers could be subset of {onDurationTimer, drx-InactivityTimer, drxRetransmissionTimer}. Alternatively, one set of DRX timers could be tised for all configured cells if all the cells have same TDD UL-DL configuration. In addition, one set of DRX timers could be used per cell if there are different TDD UL-DL configurations within the configured cell. The set of DRX timers could be subset of {onDurationTimer, drx-InactivityTimer, drxRetransmissionTimer}.

In an alternative embodiment, some methods or techniques could be adopted to let UE know the location of the next PDCCH subframe (i.e., on which cell and/or in which TTI). These methods or techniques may or may not be restricted to the scheduling Cells (i.e., with configured PDCCH).

The first method or technique is generally following a specific cell. An explicit indication is included in a RRC message (such as the Reconfiguration Message sent from network to UE) to inform UE which cell should be used to find the next PDCCH subframe (for handling consecutive PDCCH-subframe(s)). The PCell could be implicitly used to find the next PDCCH subframe. Table 2 below is an example. In the example, four cell with different TDD UL-DL configurations 0 (PCell), 3, and 6 are aggregated. "P" means that it can be considered as a PDCCH subframe for handling DRX timers.

TABLE 2

| Uplink-downlink configuration | Downlink-to-Uplink Switch-point periodicity | Subframe number | | | | | | | | |
|---|---|---|---|---|---|---|---|---|---|---|
| 0 (PCell) | 5 ms  | D | S | U | U | U | D | S | U | U | U |
| 3         | 10 ms | D | S | U | U | U | D | D | D | D | D |
| 6         | 5 ms  | D | S | U | U | U | D | S | U | U | D |
|           |       | P | P |   |   |   | P | P |   |   |   |

The consecutive PDCCH-subframe(s) are found from one cell. If there is other PDCCH-subframe(s) from other cells at the same time, UE may also monitor PDCCH for the PDCCH-subframe(s).

The second method or technique is following the cell with the most PDCCH-subframe(s). If there are more than one cell with a same number of PDCCH subframes, either cell could be chosen.

The third method or technique is following the cell with the least PDCCH-subframe(s). Here, the cell with the least PDCCH-subframes would be used to find the next PDCCH-subframe.

The fourth method or technique is following the union of the PDCCH-subframes of cells. Using this method or technique, the closest PDCCH subframe on all cells would be treated as the next PDCCH subframe. In other words, the union of the PDCCH-subframes of all cells would be used to find the next PDCCH subframe. An example is provided in Table 3 below.

TABLE 3

| Uplink-downlink configuration | Downlink-to-Uplink Switch-point periodicity | Subframe number | | | | | | | | | |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 3 | 10 ms | D | S | U | U | U | D | D | D | D | D |
| 6 | 5 ms | D | S | U | U | U | D | S | U | U | D |
|   |   | P | P |   |   |   | P | P | P | P | P | P |

The fifth method or technique is following the intersection of the PDCCH-subframes of cells. Here, the closest PDCCH subframe occurring on all cells is treated as the next PDCCH subframe. In other words, the intersection of the PDCCH subframes of all cells is used to find the next PDCCH subframe. An example is shown in Table 4 below.

TABLE 4

| Uplink-downlink configuration | Downlink-to-Uplink Switch-point periodicity | Subframe number | | | | | | | | | |
|---|---|---|---|---|---|---|---|---|---|---|---|
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
|   |   | P | P |   |   |   | P | P |   |   | P |

The sixth method or technique is to consider all subframe(s) or transmission timer intervals (TTI) as candidate for the next subframe although some of them are not PDCCH subframe(s). However, this method may apply for some of the DRX timers.

For drxRetransmissionTimer, the seventh method is following the scheduling Serving Cell with configured PDCCH to find the next PDCCH subframe for timer counting because the purpose of this timer is for retransmission which can be only scheduled from the scheduling Serving Cell.

Referring back to FIGS. 3 and 4, the UE 300 includes a program code 312 stored in memory 310. In one embodiment, the CPU 308 could execute the program code 312 to (i) configure a plurality of cells for carrier aggregation, (ii) configure the plurality of cells with a plurality of TDD (Time Division Duplex) UL-DL (Uplink-Downlink) configurations, (iii) configure the plurality of cells for DRX operation, (iv) configure a set of DRX timers for the plurality of cells, and (v) running the set of DRX timers for the plurality of cells.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels, may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for performing DRX (Discontinuous Reception) operation, comprising:
    configuring a plurality of cells for carrier aggregation;
    configuring the plurality of cells with a plurality of TDD (Time Division Duplex) UL-DL (Uplink-Downlink) configurations;
    configuring the plurality of cells for DRX operation;
    configuring a set of DRX timers for the plurality of cells; and
    running the set of DRX timers for the plurality of cells;
    wherein a RRC (Radio Resource Control) message indicates and selects a cell in the plurality of cells that should be used to find a next PDCCH (Physical Downlink Control Channel) subframe to run the set of DRX timers.

2. The method of claim 1, wherein the RRC message is a RRC Reconfiguration message.

3. The method of claim 1, wherein the set of DRX timers includes any combination or any one of onDurationTimer, drx-InactivityTimer, and drxRetransmissionTimer.

4. The method of claim 1, wherein the plurality of cells for carrier aggregation includes a PCell (Primary Serving Cell) and at least one SCell (Secondary Serving Cell).

5. A method for performing DRX (Discontinuous Reception) operation, comprising:
    connecting a UE (User Equipment) in TDD (Time Division Duplex) mode to a PCell (Primary Serving Cell) with a first TDD UL-DL (Uplink-Downlink) configuration;
    configuring the UE with at least one SCell (Secondary Serving Cell) with a second TDD UL-DL configuration that is different from the first TDD UL-DL configuration;
    configuring the PCell and the at least one SCell for DRX operation for a set of DRX timers;
    running a set of DRX timers for the PCell and the at least one SCell by following a union of PDCCH (Physical Downlink Control Channel) subframes of the PCell and the at least one SCell to find a next PDCCH subframe.

6. The method of claim 5, wherein the set of DRX timers includes any combination or any one of onDurationTimer, drx-InactivityTimer, and drxRetransmissionTimer.

7. A method for performing DRX (Discontinuous Reception) operation, comprising:
    connecting a UE (User Equipment) in TDD (Time Division Duplex) mode to a PCell with a first TDD UL-DL (Uplink-Downlink) configuration;
    configuring the UE with at least one SCell with a second TDD UL-DL configuration that is different from the first TDD UL-DL configuration;
    configuring the PCell and the at least one SCell for DRX operation with a set of DRX timers; and
    running a set of DRX timers for the PCell (Primary Serving Cell) and the at least one SCell (Secondary Serving Cell) by following PDCCH (Physical Downlink Control Channel) subframes of a specific Serving Cell to find a next PDCCH subframe.

8. The method of claim 7, the specific Serving Cell is the PCell or one of the at least one SCell.

9. The method of claim 7, wherein the set of DRX timers includes any combination or any one of onDurationTimer, drx-InactivityTimer, and drxRetransmissionTimer.

10. A method for performing DRX (Discontinuous Reception) operation, comprising:
    connecting a UE (User Equipment) in TDD (Time Division Duplex) mode to a PCell (Primary Serving Cell) with a first TDD UL-DL (Uplink-Downlink) configuration;
    configuring the UE with at least one SCell (Secondary Serving Cell) with a second TDD UL-DL configuration that is different from the first TDD UL-DL configuration;
    configuring the PCell and the at least one SCell for DRX operation with a set of DRX timers; and
    running a set of DRX timers for the PCell and the at least one SCell by following an intersection of PDCCH (Physical Downlink Control Channel) subframes of the PCell and the at least one SCell to find a next PDCCH subframe.

11. The method of claim 10, wherein the set of DRX timers includes any combination or any one of onDurationTimer, drx-InactivityTimer, and drxRetransmissionTimer.

12. A method for performing DRX (Discontinuous Reception) operation, comprising:
    connecting a UE (User Equipment) in TDD (Time Division Duplex) mode to a PCell (Primary Serving Cell) with a first TDD UL-DL (Uplink-Downlink) configuration;
    configuring the UE with at least one SCell (Secondary Serving Cell) with a second TDD UL-DL configuration that is different from the first TDD UL-DL configuration;
    configuring the PCell and the at least one SCell for DRX operation with a set of DRX timers;
    receiving a DL transmission scheduled by a Serving Cell which is one of the PCell and the at least one SCell, and decoding the DL (Downlink) transmission unsuccessfully;
    starting a drxRetransmissionTimer for the DL transmission;
    running the drxRetransmissionTimer by following PDCCH (Physical Downlink Control Channel) subframes of the Serving Cell to find a next PDCCH subframe.

13. A communication device for performing DRX (Discontinuous Reception) operation in a UE (User Equipment) in a wireless communication system, the communication device comprising:

a control circuit;
a processor installed in the control circuit;
a memory installed in the control circuit and coupled to the processor;
wherein the processor is configured to execute a program code stored in memory to perform DRX operation by:
configuring a plurality of cells for carrier aggregation;
configuring the plurality of cells with a plurality of TDD (Time Division Duplex) UL-DL (Uplink-Downlink) configurations;
configuring the plurality of cells for DRX operation;
configuring a set of DRX timers for the plurality of cells; and
running the set of DRX timers for the plurality of cells;
wherein a RRC (Radio Resource Control) message indicates and selects a cell in the plurality of cells that should be used to find a next PDCCH (Physical Downlink Control Channel) subframe to run the set of DRX timers.

14. The communication device of claim 13, wherein the RRC message is a RRC Reconfiguration message.

15. The communication device of claim 13, wherein the set of DRX timers includes any combination or any one of onDurationTimer, drx-InactivityTimer, and drxRetransmissionTimer.

16. The communication device of claim 13, wherein the plurality of cells for carrier aggregation includes a PCell (Primary Serving Cell) and at least one SCell (Secondary Serving Cell).

17. A method for performing DRX (Discontinuous Reception) operation, comprising:
configuring a plurality of cells for carrier aggregation;
configuring the plurality of cells with a plurality of TDD (Time Division Duplex) UL-DL (Uplink-Downlink) configurations;
configuring the plurality of cells for DRX operation;
configuring a set of DRX timers for the plurality of cells; and
running the set of DRX timers for the plurality of cells;
wherein a union of PDCCH (Physical Downlink Control Channel) subframes of the plurality of cells is used to find a next PDCCH subframe to run the set of DRX timers.

18. The method of claim 17, wherein the set of DRX timers includes any combination or any one of onDurationTimer, drx-InactivityTimer, and drxRetransmissionTimer.

19. The method of claim 17, wherein the plurality of cells for carrier aggregation includes a PCell (Primary Serving Cell) and at least one SCell (Secondary Serving Cell).

20. A communication device for performing DRX (Discontinuous Reception) operation in a UE (User Equipment) in a wireless communication system, the communication device comprising:
a control circuit;
a processor installed in the control circuit;
a memory installed in the control circuit and coupled to the processor;
wherein the processor is configured to execute a program code stored in memory to perform DRX operation by:
configuring a plurality of cells for carrier aggregation;
configuring the plurality of cells with a plurality of TDD (Time Division Duplex) UL-DL (Uplink-Downlink) configurations;
configuring the plurality of cells for DRX operation;
configuring a set of DRX timers for the plurality of cells; and
running the set of DRX timers for the plurality of cells;
wherein a union of PDCCH (Physical Downlink Control Channel) subframes of the plurality of cells is used to find a next PDCCH subframe to run the set of DRX timers.

21. The communication device of claim 20, wherein the set of DRX timers includes any combination or any one of onDurationTimer, drx-InactivityTimer, and drxRetransmissionTimer.

22. The communication device of claim 20, wherein the plurality of cells for carrier aggregation includes a PCell (Primary Serving Cell) and at least one SCell (Secondary Serving Cell).

23. A method for performing DRX (Discontinuous Reception) operation, comprising:
configuring a plurality of cells for carrier aggregation;
configuring the plurality of cells with a plurality of TDD (Time Division Duplex) UL-DL (Uplink-Downlink) configurations;
configuring the plurality of cells for DRX operation;
configuring a set of DRX timers for the plurality of cells; and
running the set of DRX timers for the plurality of cells;
wherein a cell in the plurality of cells with the most PDCCH (Physical Downlink Control Channel) subframes is used to find a next PDCCH subframe to run the set of DRX timers.

24. The method of claim 23, wherein the set of DRX timers includes any combination or any one of onDurationTimer, drx-InactivityTimer, and drxRetransmissionTimer.

25. The method of claim 23, wherein the plurality of cells for carrier aggregation includes a PCell (Primary Serving Cell) and at least one SCell (Secondary Serving Cell).

26. A communication device for performing DRX (Discontinuous Reception) operation in a UE (User Equipment) in a wireless communication system, the communication device comprising:
a control circuit;
a processor installed in the control circuit;
a memory installed in the control circuit and coupled to the processor;
wherein the processor is configured to execute a program code stored in memory to perform DRX operation by:
configuring a plurality of cells for carrier aggregation;
configuring the plurality of cells with a plurality of TDD (Time Division Duplex) UL-DL (Uplink-Downlink) configurations;
configuring the plurality of cells for DRX operation;
configuring a set of DRX timers for the plurality of cells; and
running the set of DRX timers for the plurality of cells;
wherein a cell in the plurality of cells with the most PDCCH (Physical Downlink Control Channel) subframes is used to find a next PDCCH subframe to run the set of DRX timers.

27. The communication device of claim 26, wherein the set of DRX timers includes any combination or any one of onDurationTimer, drx-InactivityTimer, and drxRetransmissionTimer.

28. The communication device of claim 26, wherein the plurality of cells for carrier aggregation includes a PCell (Primary Serving Cell) and at least one SCell (Secondary Serving Cell).

29. A method for performing DRX (Discontinuous Reception) operation, comprising:
configuring a plurality of cells for carrier aggregation;

configuring the plurality of cells with a plurality of TDD (Time Division Duplex) UL-DL (Uplink-Downlink) configurations;

configuring the plurality of cells for DRX operation;

configuring a set of DRX timers for the plurality of cells; and running the set of DRX timers for the plurality of cells;

wherein a cell in the plurality of cells with the least PDCCH (Physical Downlink Control Channel) subframes is used to find a next PDCCH subframe to run the set of DRX timers.

30. The method of claim 29, wherein the set of DRX timers includes any combination or any one of onDurationTimer, drx-InactivityTimer, and drxRetransmissionTimer.

31. The method of claim 29, wherein the plurality of cells for carrier aggregation includes a PCell (Primary Serving Cell) and at least one SCell (Secondary Serving Cell).

32. A communication device for performing DRX (Discontinuous Reception) operation in a UE (User Equipment) in a wireless communication system, the communication device comprising:

a control circuit;

a processor installed in the control circuit;

a memory installed in the control circuit and coupled to the processor;

wherein the processor is configured to execute a program code stored in memory to perform DRX operation by:

configuring a plurality of cells for carrier aggregation;

configuring the plurality of cells with a plurality of TDD (Time Division Duplex) UL-DL (Uplink-Downlink) configurations;

configuring the plurality of cells for DRX operation;

configuring a set of DRX timers for the plurality of cells; and running the set of DRX timers for the plurality of cells;

wherein a cell in the plurality of cells with the least PDCCH (Physical Downlink Control Channel) subframes is used to find a next PDCCH subframe to run the set of DRX timers.

33. The communication device of claim 32, wherein the set of DRX timers includes any combination or any one of onDurationTimer, drx-InactivityTimer, and drxRetransmissionTimer.

34. The communication device of claim 32, wherein the plurality of cells for carrier aggregation includes a PCell (Primary Serving Cell) and at least one SCell (Secondary Serving Cell).

35. A method for performing DRX (Discontinuous Reception) operation, comprising:

configuring a plurality of cells for carrier aggregation;

configuring the plurality of cells with a plurality of TDD (Time Division Duplex) UL-DL (Uplink-Downlink) configurations;

configuring the plurality of cells for DRX operation;

configuring a set of DRX timers for the plurality of cells; and running the set of DRX timers for the plurality of cells;

wherein an intersection of PDCCH (Physical Downlink Control Channel) subframes of the plurality of cells is used to find a next PDCCH subframe to run the set of DRX timers.

36. The method of claim 35, wherein the set of DRX timers includes any combination or any one of onDurationTimer, drx-InactivityTimer, and drxRetransmissionTimer.

37. The method of claim 35, wherein the plurality of cells for carrier aggregation includes a PCell (Primary Serving Cell) and at least one SCell (Secondary Serving Cell).

38. A communication device for performing DRX (Discontinuous Reception) operation in a UE (User Equipment) in a wireless communication system, the communication device comprising:

a control circuit;

a processor installed in the control circuit;

a memory installed in the control circuit and coupled to the processor;

wherein the processor is configured to execute a program code stored in memory to performing DRX operation by:

configuring a plurality of cells for carrier aggregation;

configuring the plurality of cells with a plurality of TDD (Time Division Duplex) UL-DL (Uplink-Downlink) configurations;

configuring the plurality of cells for DRX operation;

configuring a set of DRX timers for the plurality of cells; and running the set of DRX timers for the plurality of cells;

wherein an intersection of PDCCH (Physical Downlink Control Channel) subframes of the plurality of cells is used to find a next PDCCH subframe to run the set of DRX timers.

39. The communication device of claim 38, wherein the set of DRX timers includes any combination or any one of onDurationTimer, drx-InactivityTimer, and drxRetransmissionTimer.

40. The communication device of claim 38, wherein the plurality of cells for carrier aggregation includes a PCell (Primary Serving Cell) and at least one SCell (Secondary Serving Cell).

41. A communication device for performing DRX (Discontinuous Reception) operation in a UE (User Equipment) in a wireless communication system, the communication device comprising:

a control circuit;

a processor installed in the control circuit;

a memory installed in the control circuit and coupled to the processor;

wherein the processor is configured to execute a program code stored in memory to performing DRX operation by:

connecting a UE (User Equipment) in TDD (Time Division Duplex) mode to a PCell with a first TDD UL-DL (Uplink-Downlink) configuration;

configuring the UE with at least one SCell with a second TDD UL-DL configuration that is different from the first TDD UL-DL configuration;

configuring the PCell and the at least one SCell for DRX operation with a set of DRX timers; and running a set of DRX timers for the PCell (Primary Serving Cell) and the at least one SCell (Secondary Serving Cell) by following PDCCH (Physical Downlink Control Channel) subframes of a specific Serving Cell to find a next PDCCH subframe.

* * * * *